United States Patent [19]

Zobel

[11] Patent Number: 4,666,262

[45] Date of Patent: May 19, 1987

[54] OPTICAL SYSTEMS FOR ENDOSCOPES

[76] Inventor: Jürgen Zobel, Am Sollinger 5, 7518 Bretten-Sprantal, Fed. Rep. of Germany

[21] Appl. No.: 873,445

[22] Filed: Jun. 6, 1986

Related U.S. Application Data

[63] Continuation of Ser. No. 629,483, Jul. 10, 1984, abandoned.

[30] Foreign Application Priority Data

Aug. 18, 1983 [DE] Fed. Rep. of Germany ....... 3329785

[51] Int. Cl.⁴ .................... G02B 15/15; G02B 15/22
[52] U.S. Cl. .................................... 350/518; 350/570
[58] Field of Search ............... 350/506, 519, 423, 548, 350/552, 554–556, 559–565, 570, 572–573, 518

[56] References Cited

U.S. PATENT DOCUMENTS

| | | | |
|---|---|---|---|
| 3,608,998 | 9/1971 | Rinker | 350/42 |
| 4,076,018 | 2/1978 | Heckele | 128/6 |
| 4,300,812 | 11/1981 | Nakahashi | 350/570 |
| 4,312,572 | 1/1982 | Yamashita et al. | 350/423 |

FOREIGN PATENT DOCUMENTS

| | | |
|---|---|---|
| 698469 | 11/1940 | Fed. Rep. of Germany ...... 350/565 |
| 2640353 | 3/1978 | Fed. Rep. of Germany . |
| 2951820 | 7/1980 | Fed. Rep. of Germany . |
| 80335611 | 12/1980 | Fed. Rep. of Germany . |
| 3034311 | 4/1981 | Fed. Rep. of Germany . |
| 3111368 | 4/1982 | Fed. Rep. of Germany . |

142310  8/1983  Japan ................................... 350/423

OTHER PUBLICATIONS

Minolta, Minolta Tech. Bull. #8, "Zoom Photography with Minolta Rokker Lenses", Minolta Corp., 200 Park Ave. S., N.Y., N.Y. 10003.

"Objektive mit veranderlicher Brennweite", Camera, Internationale Monatschrift fur Photographie und Film, Bucher-Verlag, Luzern/Zurich, 1961 (Heft 1).

Primary Examiner—William H. Punter
Attorney, Agent, or Firm—Hill, Van Santen, Steadman & Simpson

[57] ABSTRACT

This invention relates to an endoscope optical system for macroscopic overall view observation and for microscopic detail observation after contacting an object by an objective viewing aperture, the system comprising an objective lens group, an occular lens group and a relay lens group wherein a displaceable lens or lens group is disposed between the occular and relay lens groups, the displacable lens or lens group being moveable through a first overall view range between limits towards and away from the relay lens group defining a first macroscopic magnification and a second detail view range between limits towards and away from the relay lens group defining a second microscopic magnification, the first range of movement being closer to the occular lens group than the second range and the ranges being spaced apart between the occular and the relay lens groups.

2 Claims, 9 Drawing Figures

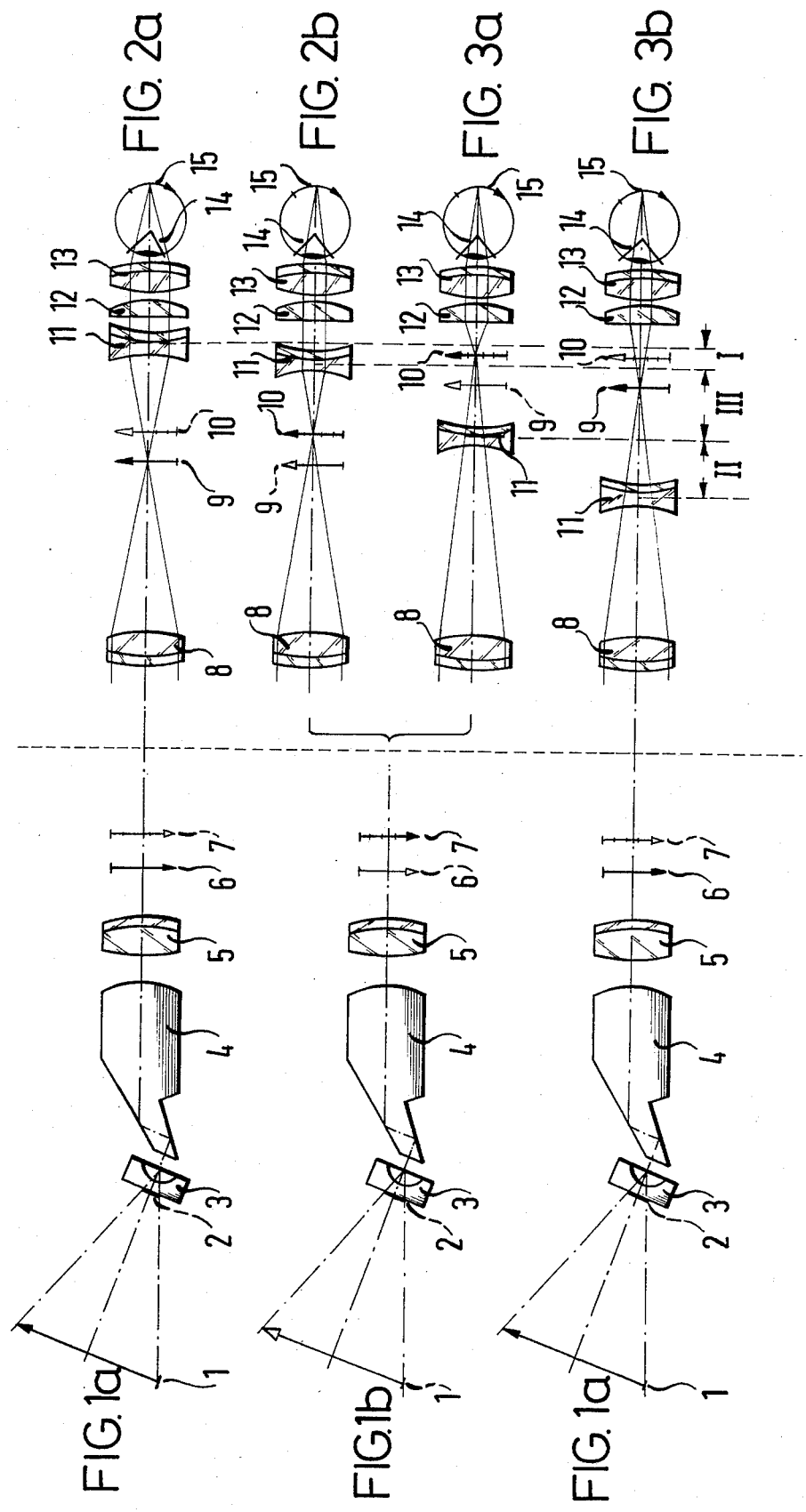

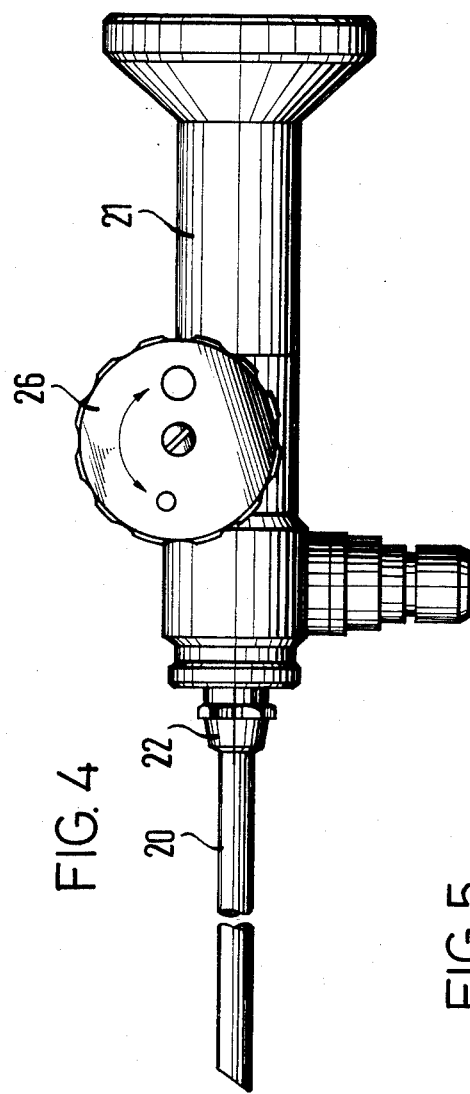
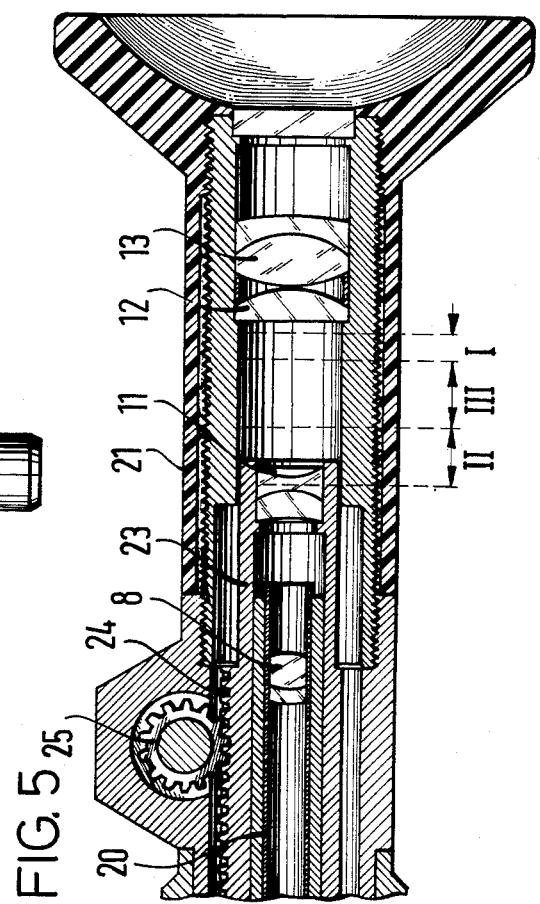

4,666,262

OPTICAL SYSTEMS FOR ENDOSCOPES

This is a continuation of application Ser. No. 629,483 filed 7/10/84, and now abandoned.

BACKGROUND OF THE INVENTION

The present invention relates to optical systems for endoscopes, for macroscopic overall view observation, and for microscopic partial view observation after contact of the objective viewing aperture with the object.

According to French Patent Specification No. 2,437,194 it is known that an optical system of an endoscope utilised for examinations may also be utilised for detailed observation of an object, e.g. such as the surfaces of organs or the like, the object placed in direct contact with the objective forming an image behind the ocular, and is examined by means of an attached eyepiece. The manual placing of an eyepiece on the ocular is inappropriate for practical application however, since a previously scrutinised detail cannot be found again or found only with great difficulty, in view of the risk of an accidental change in position of the optical system with respect to this detail said risk being connected with the handling operation.

According to German Offenlegungschrift No. 29 48 394, the endoscope optical system utilised therein is provided with a first ocular section of particular magnification, the beam path of which may optionally be directed at a second ocular of different magnification by means of a deflection device displaceable transversely to the longitudinal axis. A setting wheel is also provided for the focussing operation. The manual switching action and the required transfer of the eye from one ocular to the other lead to accidental positional changes of the endoscope optical system and are already very difficult to operate in practice for this reason. An endoscope optical system is also known from the German Gebrauchsmuster specification No. 74 40 701, which comprises a displaceable lens, by means of which it is possible to examine an object at varying magnification. Because of a minimum distance which has to be maintained, a direct contact of the objective viewing aperture with the object for microscopic viewing is impossible and this optical system is consequently not suitable for microscopic detail observation. A second disadvantage is that the two ranges of different magnification lack any substantial micro and macro ranges.

It is an object of the invention to provide an optical system, which substantially avoids the aforesaid disadvantages, which apart from overall view observation at a distance from the object also allows of a microscopic detail enlargement under direct contact of the optical system with the object, and wherein the two ranges of considerably different magnification have a pronounced micro range and macro range in each case.

SUMMARY OF THE INVENTION

According to the invention an endoscope optical system for macroscopic overall view observation and for microscopic detail observation after contacting an object by an objective viewing aperture, in which a displaceable lens or lens group is provided between a last relay lens and an occular lens or lens group and the displaceable lens or lens group for the overall view or microscopic survey observation at a distance from the objective and for the microscopic detail observation in a direct contact of the objective viewing aperture with the objective is movable for changing the magnification into two different magnification ranges and may be positioned at a distance from the two terminal positions and that to each magnification range is associated an initial value and a final value deviating from each other in spacing.

The final half of a symmetrically structured inverting section and the occular of the optical system are thus replaced by an afocal combination of variable magnification, so that the part of the optical system essential to the invention comprises three lenses or groups of lenses, the distal and proximal lenses or groups of lenses of which are positively arranged, whereas the middle moveable lens is negatively arranged, and serves the purpose of focussing in the overall view range and detail view range.

BRIEF DESCRIPTION OF THE DRAWINGS

In order that the invention may be more clearly understood, reference will now be made to the accompanying drawings which diagrammatically illustrate embodiments thereof and in which:

FIGS. 1a, 1b show the objective lens group of an endoscope optical system in relation to an object over a range of distances between the distal objective lens and the object and the position of an image at limits of the range, FIG. 1a being duplicated to facilitate association with different occular lens group conditions of FIGS. 2a and 3b to be described, FIGS. 2a and 2b show an occular lens group incorporating a moveable lens disposed between a relay lens and an eye of a viewer, the relay lens relaying the image from the objective lens group to the occular lens group as indicated by the chain dotted line between FIG. 1a and FIG. 2a and the bracket and chain dotted line between FIGS. 1b and 2b. The moveable lens in FIGS. 2a and 2b is at limits of a macro range of viewing, FIGS. 3a and 3b are views similar to FIGS. 2a, 2b, of the occular lens group but with the moveable lens at respective limits of a micro range of viewing, FIG. 3a being associated with the objective group as shown in FIG. 1b and FIG. 3b being associated with the objective group as shown in FIG. 1a.

FIG. 4 shows a side view of an endoscope optical system incorporating the lens arrangement of FIGS. 1a to 3b, and FIG. 5 shows the proximal part of the endoscope of FIG. 4 in section and to an enlarged scale.

DETAILED DESCRIPTION OF THE EMBODIMENTS SHOWN IN THE DRAWINGS

As shown in FIGS. 1a and 1b the objective lens group comprises a group of objective lens 3,4,5 of which the distal objective 3 is arranged to be placed at a distance from an object at position 1 for overall viewing or in contact with the object at position 2 for detail viewing, corresponding image positions being indicated at 6,7 respectively. In FIGS. 1a and 1b numerals 1 and 2 indicated the relative position of the object being viewed (illustrated as an arrow tipped line) with position 1 being spaced from the distal objective 3 and position 2 being in contact with the distal objective 3.

As shown in FIGS. 2a to 3b the occular lens group comprises lenses 11,12,13 aligned with a relay lens 8 arranged to relay the image 6,7 from the objective lens group 3,4,5 to the occular lens group 11,12,13 as indicated at 9,10 for viewing by an eye lens 14 for focussing on the eye retina 15. The moveable lens 11 is reversably moveable between the position of FIG. 2a and that of FIG. 3b over three ranges indicated by I, III and II, I being a first magnification range for macro viewing, II being a second, higher magnification range for micro viewing and III being an intermediate range where no real image may be observed and which should be traversed rapidly between the usable ranges I and II. It is to be understood that the moveable lens 11 may usefully be set at any position within the ranges I and II in order to focus the image 9,10 relayed from the objective lens group 3,4,5 onto the retina 15 of the viewer's eye.

As may be seen from FIGS. 2a to 3b the two different magnification ranges I and II are provided having precise limits shown at FIGS. 2a and 2b for range I and at FIGS. 3a, 3b for range II which allow for utilisation of the endoscope for overall view observation with the object 1 spaced from the distal objective 3 or for detail view observation with the distal objective 3 in contact with the object at position 2.

If the endoscope is utilised for overall view observation at low magnification, i.e. at maximum distance of the object at position 1 from the objective according to FIGS. 1a and 2a, the image of the object at position 1 is depicted in sharp focus in the first image plane 6 after the objective 3,4,5 and in the first image plane 9 between the last relay lens 8 and the ocular 11,12,13 at the proximal side, and is projected on to the retina 15 via the eye lens 14.

If the endoscope objective 3 is now placed in contact with the object as shown at 2 in FIG. 1b, the image 7 is relayed by lens 8 to the image plane 10 and to focus this on the eye retina 15 it is necessary to move the lens 11 from the first limit position of FIG. 2a to the second limit position of magnification range I as shown in FIG. 2b. Thus a first detail observation may be made at the first magnification by this distance alteration to obtain refocussing.

For increased magnification of the detail observation of the object at position 2 the moveable lens 11 is further displaced towards the relay lens 8 from the position of FIG. 2b to that of FIG. 3a, i.e. to the first limit of range II, the distal objective 3 remaining in contact with the object at position 2. In this condition the object at position 2 is depicted in sharp focus in the image plane 7 behind the objective 3,4,5 and in image plane 10 lying between a relay lens group defined by the relay lens 8 and the moveable lens 11, the remaining occular lens 12,13 now forming an occular lens group focussing the image on the retina 15 via the eye lens 14.

The moveable lens 11 may be moved from the FIG. 3a to the FIG. 3b condition i.e. to the second limit of range II for overall view observation at the higher magnification of range II with the object at position 1 at a maximum distance from the distal objective 3. It will be understood that the objective 3 will correspondingly be moved away from contact with the object at position 2 to position the object at position 1 relative to the objective 3. In the condition of FIGS. 1b and 3b the endoscope will depict the object at position 1 in overall view but under substantial enlargement compared with range I in the FIGS. 1b and 3a condition.

FIGS. 4 and 5 show a practical construction of the endoscope lens system of FIGS. 1a to 3b. The objective lens groups 3,4,5 and the relay lens 8 are housed in an endoscope optical system shaft 20 and the occular group 11,12,13 in a proximal casing section 21 coupled to the shaft 20 by a core 22.

The moveable lens 11 is supported in a cylindrical mounting 23 axially displaceable about the shaft 20 by means of a rack 24 formed externally of the mounting 23 which is engaged by a pinion 25 rotatably mounted within the casing and driven by an external handle 26. By rotation of the handle the lens 11 may be moved adjustably through the ranges I, III, II at will.

It is to be understood that where lenses are referred to a lens may comprise a compound lens or lens group. It will be apparent that various changes may be made in the form construction and of the embodiments described without departing from the spirit and scope of the invention described in the foregoing with reference to preferred embodiments.

What is claimed is:

1. Endoscope optics for microscopic survey observation and for microscopic detail observation wherein survey observation is accomplished with the object spaced from a distal lens means of the endoscope optics and detail observation is accomplished with an object substantially in contact with the distal lens means, the optics including distal lens means, relay lens means, displaceable lens means and proximal eyepiece lens comprising said displaceable lens means being situated between a last relay lens of the relay lens means and the eyepiece lens means and wherein the displaceable lens means is positionable selectively in a first magnification range (I) and, after transversing an undefined range (III) at a second magnification range (II) and wherein the magnification in the first magnification range differs from the magnification in the second magnification range and wherein focussing for both the survey observation and the detail observation can be adjusted in each of range (I) and range (II) and wherein survey observation of an object spaced from the distal lens means may be made in focus in range (I) at a first magnification and in focus at range (II) at a second magnification and wherein detail observation of objects substantially in contact with the distal lens means may be made in focus in range (I) at a first magnification and in focus in range (II) at a second magnification and wherein survey observation is at lesser magnification than detail observation.

2. Endoscope optics according to claim 1 wherein the displaceable lens means or lens group lying between the last relay lens and the eyepiece lens means is negatively fashioned.

* * * * *